Jan. 4, 1949.  H. A. BRASSERT  2,457,861
METHOD OF MANUFACTURING METAL PRODUCTS
Original Filed May 14, 1943  2 Sheets-Sheet 1

Jan. 4, 1949. H. A. BRASSERT 2,457,861
METHOD OF MANUFACTURING METAL PRODUCTS
Original Filed May 14, 1943 2 Sheets-Sheet 2

INVENTOR:
Herman A. Brassert
BY
ATTORNEYS

Patented Jan. 4, 1949

2,457,861

UNITED STATES PATENT OFFICE 2,457,861

METHOD OF MANUFACTURING METAL PRODUCTS

Herman A. Brassert, Washington, Conn., assignor to H. A. Brassert & Company, New York, N. Y., a corporation of Illinois Original application May 14, 1943, Serial No. 486,989. Divided and this application February 15, 1945, Serial No. 577,962

6 Claims. (Cl. 29—189)

This invention relates to the manufacture of metal products and has particular reference to a continuous process for direct manufacture of finished or semi-finished iron and steel products from iron oxides. The present application is a division of application Serial No. 486,989, filed May 14, 1943, now Patent No. 2,383,766.

Iron and steel products are usually manufactured either by rolling, forging, or extruding a billet of iron or steel initially formed from molten metal, or by assembling bars of wrought iron or soft steel to form a billet of the proper size and heating it to the proper temperature for rolling, forging, or extrusion to the desired finished or semi-finished shape. These processes are intermittent and involve substantial loss of time and heat as the result of transfer from one station to another. Such products have also been produced by directly reducing finely-divided iron oxides and compacting the reduced particles into a billet which is then heated to the proper temperature and rolled, forged, or extruded to the desired shape. This last-named process is disclosed in Patent No. 2,252,697, issued August 19, 1941, to applicant, and is admirably suited for producing relatively small-dimensioned products from correspondingly small compacted billets or briquettes, but when large products or a plurality of small products are to be extruded from a single large billet, non-uniform products frequently result, because of the practical impossibility of compacting the reduced grains to the same degree throughout any cross-section of a large compacted billet. This non-uniform density in a large billet is probably due to the irregular shapes of the particles and consequent friction between them during compacting, which precludes uniform pressure throughout while they are being compacted, so that whereas the billet has a dense surface skin, the density gradually decreases toward the center or core of the billet. Theoretically, this condition could be remedied either by increasing the temperature to the fusion point, or greatly increasing the compacting pressures, or both, but these expedients have proven impractical, owing to sticking of the particles to the press when high temperatures are used, and also because the compacting pressures that are necessary to secure a homogeneous billet of large size are disproportionately high, requiring an impractically large and powerful press.

In accordance with the present invention, a process is provided for continuously producing uniform iron and steel products in finished or semi-finished form from a large billet of uniform density throughout, produced directly from finely-divided iron oxides as a continuous process without material loss of heat or time.

The invention comprises directly reducing finely-divided iron oxides at temperatures below those at which the particles agglomerate or frit together, compacting the reduced material while still in a reducing atmosphere and hot from the reducing operation into relatively large plate-like briquettes, superimposing such plate-like briquettes to form a stack of a size desired for the billet, heating the assembled plate-like briquettes to the extruding or rolling temperature, not only to prepare them for rolling or extrusion, but also to consolidate or weld the grains together and to partially fuse the stacked briquettes to each other, and finally compressing, forging, rolling or extruding the resulting hot billet into the desired finished or semi-finished product, all as a continuous process to conserve heat and in a reducing atmosphere to preclude reoxidation. Preferably the plate-like briquettes are rolled to provide a corrugated transverse cross-section so that they will automatically fit together without disarrangement during subsequent handling, heating, and rolling, forging or extruding process, and, if desired, transverse corrugations may also be provided to preclude endwise shifting of the plate-like briquettes. Also compressing or compacting in a press may precede forging or rolling or extrusion and in order to consolidate the material into a more solid, basic workable blank or billet.

It will be seen that the process of this invention provides a very effective and simple method of directly obtaining a large billet of substantially homogeneous density, since the material constituting it is in effect compacted as separate units of the whole, with the result that when the product is finished its grain structure is uniform throughout, not withstanding that it was formed initially of fine, discrete particles. In this way the economy of forming finished or semi-finished products from a large billet is realized. By addition of modifying agents, such as alloying metals in finely-divided form, carbon and the like, virtually any composition of the finished product to provide desired physical properties may be obtained, these materials being admixed with the reduced material prior to briquetting into the plate-like briquettes described.

For a more complete understanding of the invention, reference may be had to the accompanying drawings, in which.

Figure 1:
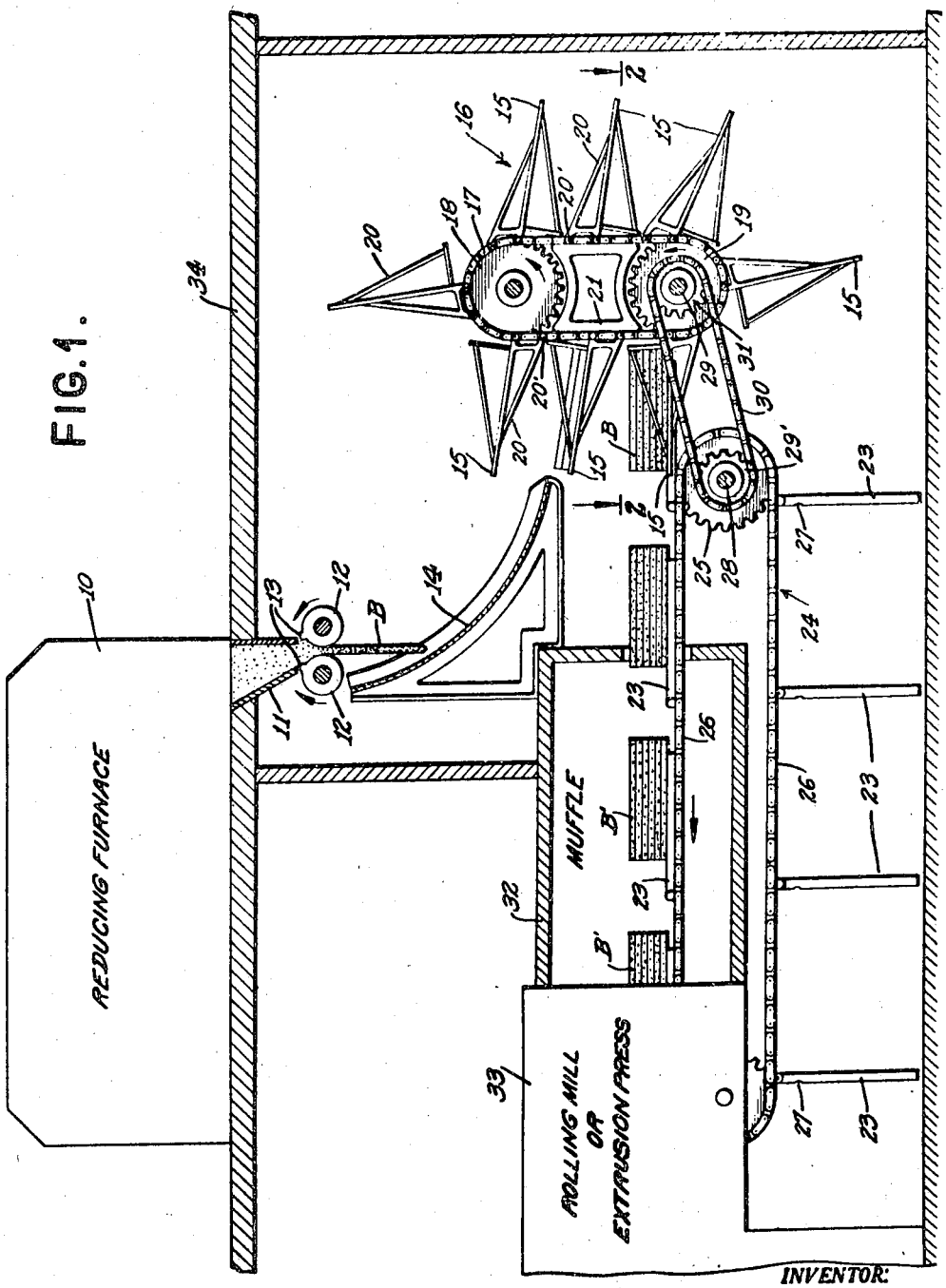
Figure 1 is a partially schematic representation of apparatus for carrying out the method of this invention.

Referring to Fig. 1 of the drawings, numeral 10 designates a reducing furnace, preferably of the type utilizing the method in which finely-divided oxides are reduced by preheated reducing gases below the temperature at which the particles agglomerate and frit together, and in which the reducing gas is supplied to the bottom of a bed of oxide under such conditions as to impart to the bed a fluid-like condition so that it flows along the hearth while being reduced. Methods and apparatus of this type are disclosed in Patent No. 2,371,619, issued March 20, 1945, to J. C. Hartley, Patent No. 2,316,664, issued April 13, 1943, to applicant and J. C. Hartley, or Patent No. 2,389,133, issued November 20, 1945, to applicant and C. F. Ramseyer, or Patent No. 2,404,944, issued July 30, 1946, to applicant.

Figure 3:
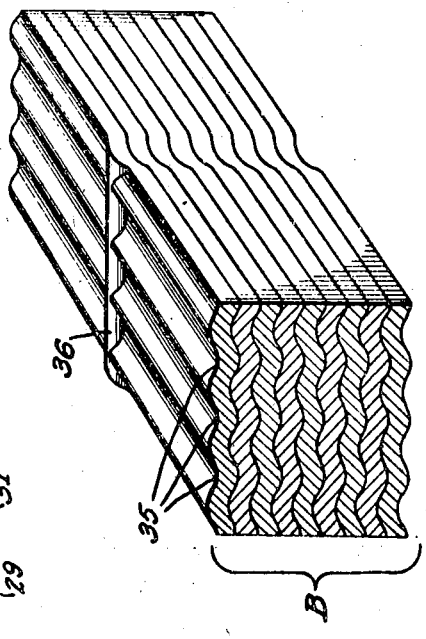

The reduced finely-divided material discharged by the furnace 10 through hopper 11 is supplied to briquetting rolls 12 which are provided with parallel alternate ridges and depressions so arranged that the depressions in one of the rolls cooperates with a ridge in the other roll, so that the elongated rectangular plate-like briquette B produced by the rolls 12 is corrugated transversely as shown in Fig. 3. The dimensions of the briquettes B are determined by the size of the billet desired, and preferably is from one to three feet wide and two to six feet long, with a web thickness of from one-fourth to one inch. The rolls 12 have diameters and dimensions to accommodate the size of briquette desired and are provided with cooperating transverse cut-off ridges 13. Prior to briquetting, the material may be further concentrated magnetically as described in Patent No. 2,287,663, or in copending application Serial No. 485,195, filed April 30, 1943, by applicant, and the material is maintained in a reducing atmosphere so as to preclude reoxidation as is described in greater detail in said Patent No. 2,287,663. Also, briquetting is effected immediately upon discharge of the material from the reducing furnace 10 so that the heat of reduction is retained and contributes to the effective compacting of the particles into the plate-like briquettes B.

The briquettes B are deposited by the briquetting rolls 12 upon a chute 14 down which they slide to be discharged upon the platform 15 of a stacking apparatus generally designated 16 and comprising a series of such platforms 15 carried upon a driven belt or chain 17 moving in a vertical direction over upper sprocket 18 and lower sprocket 19, the latter being driven from a source of power, not shown. The rate of movement of the platforms 15 is such as to permit the collection of a predetermined number of briquettes B upon each platform 15 as it passes the chute 14, before the next succeeding platform 15 moves opposite chute 14 for collecting an equal number of the briquettes B. The stacking apparatus 16 may be of any form, the form shown serving merely to illustrate one type of apparatus which may be used for the purpose.

In the particular stacking machine 16 shown, two chains 17 carry the platforms 15 which have diagonal braces 20 engaging studs 20' on the chain 17 when moving downwardly in a vertical position so the platform 15 is held firmly and is supported so as to sustain the gradually increasing load of the briquettes as they accumulate thereon. The chains 17 move over the frame 21 which holds the platforms steady in the course between the upper sprocket and the lower sprocket 19.

Figure 2:
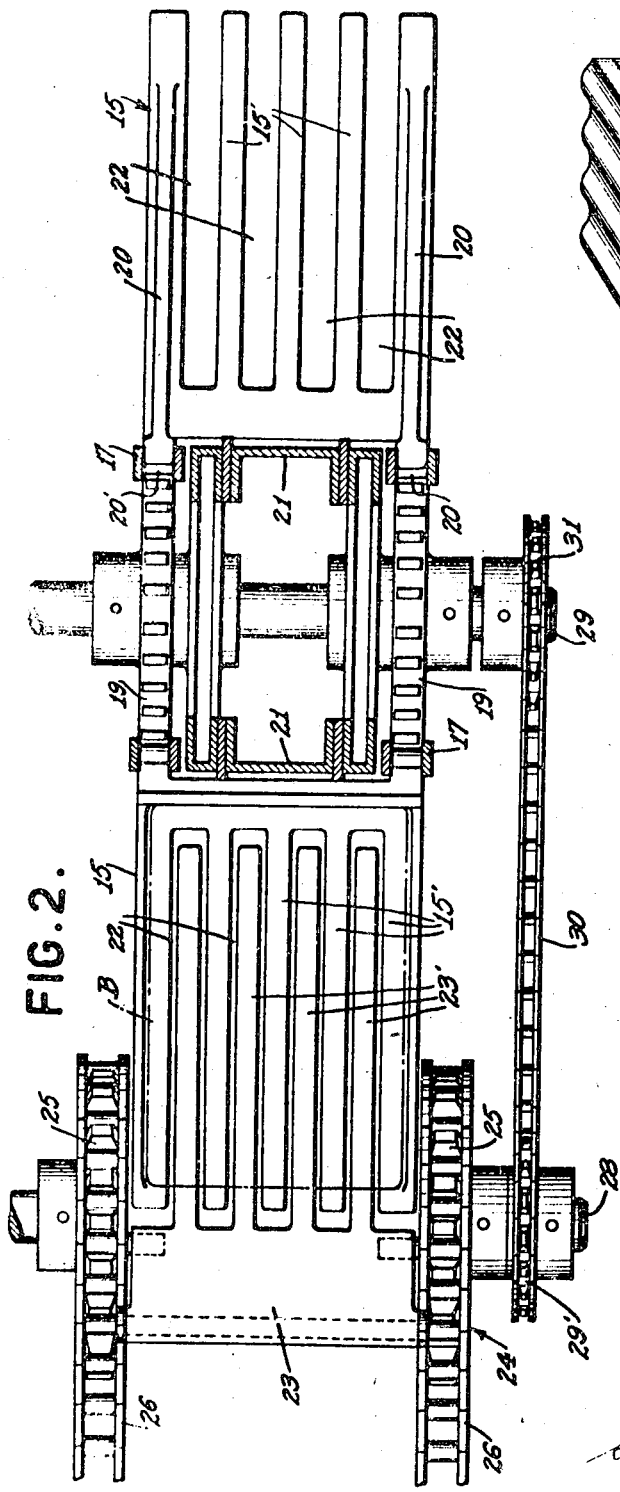
Fig. 2 is a horizontal section through a portion of the apparatus as seen along the line 2—2 of Fig. 1; and, Fig. 3 is a perspective view of a billet comprising a stack of the plate-like briquettes.

As shown in Fig. 2, the floor of each platform 15 of the stacking apparatus 16, comprises spaced parallel cantilever bars 15' providing longitudinal slots 22 so as to permit passage of the cantilever bars 23' of the corresponding platform 23 of conveyor 24, which accordingly removes the stack of plate-like briquettes B from the platform 15 on which they are stacked in the manner described. The conveyor 24 comprises a pair of sprockets 25, one of which is visible in Fig. 1, over which pass chains 26, pivotally carrying the transfer platform 23, which are held rigid horizontally by engagement with detents 27 on chains 26 as the platforms 23 swing into horizontal position to mesh with a corresponding stacking platform 15.

Conveyor 24 is driven at a rate of speed such as to remove and convey each stack of briquettes B from the corresponding stacking platform 15 before the next succeeding platform approaches. The shaft 28 carrying the sprockets 25 of the conveyor 24 over which the chains 26 pass is fitted with a smaller sprocket 29' driven by chain 30 connected to sprocket 31 on the shaft 29 of the stacking apparatus 16, or the conveyor 24 may be separately driven, if desired.

Conveyor 24 carries the stack of briquettes B into the muffle or other heating furnace 32, wherein the temperature of the stack of briquettes B is raised to the welding point whereby the particles constituting the individual briquettes fuse together and the briquettes also fuse together to a certain extent to form a relatively unitary structure or billet B', but the temperature is not sufficiently high to cause melting, so that the billet B' retains its shape. The billet B' so formed is conveyed directly by the conveyor 24 or other means into a conventional rolling mill 33, extrusion press, or other apparatus for forming the billet B' into finished or semi-finished steel products. For example, the entire billet B' may be rolled or extruded into one finished shape or product, or it may be extruded through a multiple draw plate, or divided into a plurality of strands for forming the same into a plurality of like or unlike rods, wires, bars, or other shapes.

Preferably in order to preclude reoxidation of the reduced material constituting the plate-like briquette B, the entire apparatus described up to muffle 32 is enclosed in a housing 34 containing a reducing atmosphere, either reducing gas emerging from the reducing furnace 10 into housing 34 with the reduced material or separately supplied. Also the heating in muffle 32 is preferably conducted in a non-oxidizing atmosphere so that practically pure virgin metal is supplied to the rolling mill, extrusion press, or other finishing or semi-finishing apparatus 33.

The corrugations 35 formed longitudinally of the briquette B provide for the accurate alignment of the briquettes B one upon the other as they are discharged by chute 14 upon platform 15 since the corrugations of adjacent briquettes B interfit, as shown in Fig. 3. The alignment of the briquettes longitudinally is effected by the frame of the platform 15 but to facilitate such alignment the briquette may be provided with a transverse corrugation 36, either at the center as shown in Fig. 3, or at one end thereof, depending upon requirements.

The billet B' has dimensions determined by the dimensions of the briquette B and the number of them that are superimposed. Preferably it is made square in transverse section and has dimensions of from about one to three feet square in transverse section and from about two to six feet long, and may run as large as four feet square in transverse section by twelve feet long, and even larger, depending upon requirements, and the availability of heavy presses. Of course the briquettes are then proportionately larger and thicker.

It will be observed that the corrugations 35 and 36 serve to stiffen and hence provide a relatively rigid briquette, which is self-sustaining and will not break or shatter when deposited upon chute 14 or platform 15. The corrugations also serve to facilitate stacking and to increase the surface area of the briquettes to facilitate heating in the muffle 32 and consolidation of the billet B' when the temperature thereof reaches the welding point in muffle 32. Mechanical consolidation of the particles and briquettes constituting billet B' may be effected prior to rolling, extruding, or forging by passing the billet B' through rolls or a forging hammer or press before feeding it into the finishing or semi-finishing apparatus 33, to which it is preferably fed in the direction of the length of the briquettes originally constituting it, i. e., in the direction of the long corrugations 36 in Fig. 3, in order to have a somewhat elongated grain structure.

As aforementioned, modifying agents, such as alloying metals, carbon and the like, may be admixed with the reduced material discharged from furnace 10 into chute 11 prior to briquetting, as described in said Patent No. 2,252,967, so that when the extrusion, rolling, forging, or other forming operation is effected, the physical and chemical characteristics of the finished material may be predetermined to provide the properties desired.

Although a preferred method is illustrated and described in connection with the drawings, it is to be understood that the invention is not limited thereby but is susceptible of changes in form and detail within the scope of the appended claims.

I claim:

1. The method of making metal products, which consists in reducing metallic oxide material in a reducing zone below temperatures at which the material frits or agglomerates, compacting the reduced material in finely-divided form into self-sustaining plate-like briquettes while corrugating the same in parallel relation and separating the corrugated briquettes, assembling a plurality of said briquettes in superimposed flatwise relation with their corrugations interfitting, heating the superimposed briquettes to the welding point to at least partially weld the reduced material and briquettes together into a billet, and then deforming the billet while so heated into a metal product, the several steps being immediately successive in a continuous process.

2. The method of making metal products, which consists in compacting the metal in finely-divided form into a plurality of self-sustaining plate-like briquettes of substantially uniform size, assembling a predetermined number of said briquettes in superimposed flat-wise relation and registering their edges to form a stack of the desired dimensions, heating said stack to soften the particles constituting the briquettes to cause them and the contacting briquettes to at least partially weld together into a substantially homogeneous billet, and then deforming said billet while so heated by forcing the same through a metal-working device in a direction parallel to the planes of cleavage between the individual briquettes constituting said billet to thereby form a finished or semi-finished metal product of the desired dimensions.

3. The method of making metal products, which consists in compacting the metal in finely-divided form into a plurality of self-sustaining plate-like briquettes of substantially uniform size, assembling a predetermined number of said briquettes in superimposed flat-wise relation and registering their edges to form a stack of the desired dimensions, heating said stack to soften the particles constituting the briquettes to cause them and the contacting briquettes to at least partially weld together into a substantially homogeneous billet, subdividing the billet while so heated into a plurality of strands each including a portion of each briquette constituting said original billet, and then deforming each of said strands into a finished or semi-finished metal product of the desired dimension.

4. The method of making metal products, which consists in compacting the metal in finely-divided form into a plurality of self-sustaining plate-like briquettes of substantially uniform size, simultaneously forming complementary projections and recesses in the respective upper and lower surfaces of said briquettes, assembling a predetermined number of said briquettes in superimposed flat-wise relation and registering their complementary projections and recesses to form a stack of the desired dimensions, heating said stack to soften the particles constituting the briquettes to cause them and the contacting briquettes to at least partially weld together into a substantially homogeneous billet, and then deforming said billet while so heated by applying dimension-reducing pressure thereto in a direction substantially normal to the large area of the individual briquettes constituting said billet to form a finished or semi-finished metal product of the desired dimensions.

5. The method of making metal products from a plurality of substantially like self-sustaining units composed of reduced metallic oxide particles, which consists in indiscriminately assembling a predetermined quantity of said units, compacting said assembly of units into a self-sustaining billet of predetermined dimensions in which the reduced particles are substantially uniformly distributed in mutual contact and substantially uniform density, and heating the billet to soften the contacting particles and cause them to at least partially weld together into a substantially homogeneous finished or semi-finished metal product.

6. The method of making metal products from a plurality of substantially like self-sustaining units composed of reduced metallic oxide particles, which consists in indiscriminately assembling a predetermined quantity of said units, preliminarily compacting said assembly of units into a self-sustaining billet of predetermined dimensions in which the reduced particles are substantially uniformly distributed in mutual contact and substantially uniform density, heating the billet to soften the contacting particles and cause them to at least partially weld together, and again compacting said billet while so heated into a substantially homogeneous finished or semi-finished metal product.

HERMAN A. BRASSERT.

REFERENCES CITED

The following references are of record in the file of this patent:

UNITED STATES PATENTS

| Number | Name | Date |
|---|---|---|
| 1,510,745 | Montgomery | Oct. 7, 1924 |
| 1,930,287 | Short | Oct. 10, 1933 |
| 2,097,502 | Southgate | Nov. 2, 1937 |
| 2,178,527 | Wellman | Oct. 31, 1939 |
| 2,178,529 | Calkins | Oct. 31, 1939 |
| 2,240,971 | Wellman | May 6, 1941 |
| 2,252,697 | Brassert | Aug. 19, 1941 |
| 2,290,734 | Brassert | July 21, 1942 |
| 2,299,192 | Tormyn | Oct. 20, 1942 |
| 2,341,732 | Marvin | Feb. 15, 1944 |